(12) United States Patent
Smith et al.

(10) Patent No.: US 6,344,071 B1
(45) Date of Patent: Feb. 5, 2002

(54) BROAD SPECTRUM FILTER SYSTEM FOR FILTERING CONTAMINANTS FROM AIR OR OTHER GASES

(75) Inventors: Simon J. Smith, Glenburnie; Jamie A. Hern, Brockville, both of (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/576,406

(22) Filed: May 22, 2000

(51) Int. Cl.[7] ............................ B01D 53/04; B01D 39/02
(52) U.S. Cl. ............................ 95/274; 95/142; 55/486; 55/512; 55/524; 96/121; 96/132; 502/401
(58) Field of Search .................... 55/486, 524, 518, 55/519, 512; 96/121, 131, 132; 95/141, 142; 502/401

(56) References Cited

U.S. PATENT DOCUMENTS

| | | |
|---|---|---|
| 1,519,470 A | 12/1924 | Wilson et al. |
| 1,781,664 A | 11/1930 | Rockwell |
| 2,400,709 A | 5/1946 | Patrick |
| 2,511,288 A | 6/1950 | Morrell et al. |
| 2,511,920 A | 6/1950 | Morrell et al. |
| 2,523,875 A | 9/1950 | Morrell et al. |
| 2,612,434 A | 9/1952 | Rockwell et al. |
| 2,818,323 A | 12/1957 | Haensel |
| 2,920,050 A | 1/1960 | Blacet et al. |
| 2,920,051 A | 1/1960 | Wiig et al. |
| 2,963,441 A | 12/1960 | Dolian et al. |
| 3,251,365 A | 5/1966 | Keith, II et al. |
| 3,355,317 A | 11/1967 | Keith, II et al. |
| 3,453,807 A | 7/1969 | Taylor |
| 3,460,543 A | 8/1969 | Keith, II et al. |
| 3,489,507 A | 1/1970 | Gardner et al. |
| 3,491,031 A | 1/1970 | Stoneburner |
| 3,532,637 A | 10/1970 | Zeff et al. |

(List continued on next page.)

FOREIGN PATENT DOCUMENTS

| | | |
|---|---|---|
| EP | 405 404 A1 | 1/1991 |
| EP | 0 370 141 B1 | 12/1994 |
| EP | 0 629 437 B1 | 12/1994 |
| GB | 1 123 822 | 8/1968 |
| GB | 2 187 725 A | 9/1987 |

OTHER PUBLICATIONS

Deitz et al., *Recovery of CK Efficiency of Whetlerites by CO Pretreatment–Role of TEDA and Surfactants*, Naval Research Laboratory.

(List continued on next page.)

*Primary Examiner*—Robert A. Hopkins
(74) *Attorney, Agent, or Firm*—David B. Kagan; Karl G. Hanson

(57) ABSTRACT

Filter medium includes at least two kinds of filter media particles. A first plurality of filter media particles includes an extended surface area substrate comprising at least one transition metal impregnant. A second plurality of filter media particles includes an extended surface area substrate comprising a tertiary amine impregnant. In preferred embodiments, at least one and preferably both of the kinds of filter media particles is/are substantially free of chromium, and more preferably contain no detectable chromium. The filtering medium has very broad filtering capabilities. The filtering medium successfully achieves performance levels mandated both by applicable industrial filter approval specifications and by international military filter performance specifications.

44 Claims, 3 Drawing Sheets

U.S. PATENT DOCUMENTS

| | | |
|---|---|---|
| 3,605,759 A | 9/1971 | Owens, Jr. et al. |
| 3,618,295 A | 11/1971 | Geiger, Jr. et al. |
| 3,618,691 A | 11/1971 | Honda |
| 3,739,550 A | 6/1973 | Martin et al. |
| 3,796,023 A | 3/1974 | Raduly |
| 3,901,818 A | 8/1975 | Durand et al. |
| 3,935,294 A | 1/1976 | Teller |
| 4,016,242 A | 4/1977 | Deitz et al. |
| 4,022,223 A | 5/1977 | Rainer et al. |
| 4,040,802 A | 8/1977 | Deitz et al. |
| 4,070,300 A | 1/1978 | Moroni et al. |
| 4,091,822 A | 5/1978 | Ihrig et al. |
| 4,111,833 A | 9/1978 | Evans |
| 4,204,980 A | 5/1980 | Pasha et al. |
| 4,212,852 A | 7/1980 | Aibe et al. |
| 4,222,892 A | 9/1980 | Motojima et al. |
| 4,271,133 A | 6/1981 | Tellis |
| 4,293,317 A | 10/1981 | Kovach |
| 4,474,739 A | 10/1984 | Zackay et al. |
| 4,531,953 A | 7/1985 | Groose et al. |
| 4,594,231 A | 6/1986 | Nishino et al. |
| 4,737,173 A * | 4/1988 | Kudirka et al. ............... 56/471 |
| 4,801,311 A | 1/1989 | Tolles |
| 4,802,898 A | 2/1989 | Tolles |
| 5,063,196 A | 11/1991 | Doughty et al. |
| 5,145,820 A | 9/1992 | Liang et al. |
| 5,492,882 A | 2/1996 | Doughty et al. |
| 5,792,720 A | 8/1998 | Ro et al. |

OTHER PUBLICATIONS

Maggs et al., *Enhancement of CK Protection By Use of Teda Impregnated Charcoal*, Chemical Defence Establishment Technical Paper No. 225, Jun. 1977.

Smith, Simon James, *Behaviour of Impregnated Activated Charcoal Cloth With Hydrogen Cyanide*, University of Manchester Thesis, Oct. 1982 to Sep. 1985.

*Military Problems with Aerosols ans Nonpersistent Gases*, National Defense Research Committee, 1946.

Chemsorb™ 620 product literature.

*Defense Against Toxic Agents*, Chemicals in War, vol. 5, pp. 810–815.

* cited by examiner

BROAD SPECTRUM FILTER SYSTEM FOR FILTERING CONTAMINANTS FROM AIR OR OTHER GASES

FIELD OF THE INVENTION

This invention relates to filter media used to remove contaminants from air or other gases. More particularly, the invention relates to such media that incorporate two or more different kinds of filter media particles in order to provide broad spectrum filtering performance.

BACKGROUND OF THE INVENTION

Extended surface area substrate particles, such as activated carbon, alumina, zeolites, and the like, are widely used in air filtration because of the ability of such materials to remove a wide range of different materials. The filtration characteristics of these materials arises from a highly porous or convoluted surface structure. In the case of activated carbon, the surface porosity results from controlled oxidation during the "activation" stage of manufacture. Activated carbon has been used for air filtration for many decades.

The ability of the carbon to remove a contaminant from the air by direct adsorption depends on a molecular-scale interaction between a gaseous molecule and the carbon surface. The extent of this interaction depends upon factors that include the physical and chemical surface characteristics of the carbon, the molecular shape and size of the gaseous compound, the concentration of the gaseous compound in the gas stream to be filtered, residence time in the carbon bed, temperature, pressure, and the presence of other chemicals. As a rule of thumb, for a single contaminant, the extent of adsorption is primarily dependent on boiling point. In general, the higher the boiling point, the greater the capacity of carbon to remove the chemical.

Accordingly, carbon does not have a great capacity by itself to remove lower boiling point gases. Treatments have been devised in which chemicals are coated on the carbon to provide filtering capabilities towards lower boiling point gases. These treatments are generally known as "impregnation" methods, and the result of treatment is an "impregnated" carbon.

Over the course of this century, development of impregnation techniques has progressed so that a variety of impregnants are available for removing a wide range of different chemicals. Progress has been accelerated during wartime, when actual and perceived threats spurred the development of specialised carbons. However, there has hitherto been a distinction between the types of filter media particles used for military applications, and those used in industrial applications. Military requirements have made it necessary for filter media particles to be capable of removing a range of chemicals, and so multi-component impregnation formulations have been devised. In industry, where the nature of hazards is known in advance, the practice has been to select a filter appropriate to the known hazard. Consequently, filters with capability toward a specific type of chemical or class of chemicals have developed for industrial applications.

Over time, regulatory structures for the selection and use of respiratory protective equipment have evolved, along with approvals systems to ensure that designs of equipment on the market are capable of meeting necessary performance requirements. Such approvals systems have been generated for industrial purposes across international boundaries. These include the European Norm system that is adopted widely in Europe and elsewhere in the world. Another example are the approvals requirements of the US National Institute for Occupational Safety and Health that have been adopted in the USA, Canada and certain other countries. For military requirements, performance specifications are determined by each national need, although there are some internationally agreed upon standards under the North Atlantic Treaty Organisation.

The first U.S. patent for a treatment of carbon to remove a variety of military gases derived from developments to protect personnel in World War I battles in which chemical agents were used in excess. The patent by Joshua C. Whetzel and R. E. Wilson (U.S. Pat. No. 1,519,470, 1924) described the use of an ammoniacal solution of copper carbonate to impregnate a granular activated carbon. This technique became known as "Whetlerization", and the carbon product "Whetlerite". Variations on this technique have been developed over time. (U.S. Pat. No. 2,902,050, U.S. Pat. No. 2,902,051, DE 1,098,579, FR 1,605,363, JP 7384,984, CZ 149,995).

During World War II, substantial technical investigations were made into the use of impregnated carbons. The U.S. research in this area is summarized in "Military Problems with Aerosols and Nonpersistent Gases", Chapter 4: "Impregnation of Charcoal", by Grabenstetter, R. J., and Blacet, F. E., Division 10 Report of US National Defense Research Committee (1946) pp.40–87. This report provides in depth coverage of a number of impregnant formulations.

The United Kingdom pursued a slightly different impregnation approach. There, copper oxide was mixed with coal prior to carbonization and activation, so that the activated carbon contained metallic copper distributed throughout its structure. This material was the basis for the filter carbons used in World War II.

The ability of the carbon to remove cyanogen chloride (CK) was improved by the application of the amine pyridine or, separately, by impregnation with chromium in the form of sodium dichromate. This form of carbon, in combination with a pyridine impregnant, was used in military respirator filters manufactured in the 1 970s.

Post World War II research has explored how the addition of organic compounds to impregnated carbon could improve the shelf life. Experiments were undertaken in the UK, France and elsewhere with various amines. One such material found to improve the shelf life towards cyanogen chloride is triethylenediamine (also known as TEDA or 1,4-diazabicyclo-2,2,2-octane). When impregnated on carbon, TEDA has been found in its own right to be capable of reacting directly with cyanogen chloride and is also highly capable of removing methyl bromide and methyl iodide. TEDA is strongly adsorbed onto carbon, is stable, is effective at low levels, and has minimal toxicity compared with other amine compounds. TEDA is a solid at room temperature, but sublimes readily.

Chromium has traditionally been used as a carbon impregnant in military applications, as it facilitates the satisfactory removal of hydrogen cyanide and cyanogen chloride (CK). Because the hexavalent ionic form of chromium has been identified as a potential lung carcinogen, work undertaken in recent times and dating back to the early 1970's has explored formulations that avoid or reduce the level of chromate salts as impregnants.

In recent times, the traditional role of military forces has changed from a more or less predictable battlefield conflict to encompass peace-making and peace-keeping roles, and supporting civilian authorities in emergency response. Such activities may involve responding to the release of chemicals by accident or intent. Intentional release of chemicals, referred to as "chemical terrorism", has occurred in fact and been threatened numerous times. These incidents may involve chemicals that have been traditionally regarded as military threats or may involve hazardous chemicals normally used in industry. The response to these hazards is ultimately likely to involve both civilian and military authorities and is likely to require protection systems that meet industrial approvals as well as military performance requirements.

Filtration-based protection systems are appropriate for personnel undertaking various tasks at some distance from a point of chemical release. For such cases, it is most desirable to be able to respond to a hazard quickly and without delay. Conventionally, however, delay may be inevitable as it may be necessary to first identify a threat in order to select an appropriate filter. In order to be able to respond to a wide range of possible hazards, it has been necessary to carry inventories of many different kinds of filters. It would be much more desirable to have one filter type that can provide protection against many different hazards. Such a multi-purpose filter desirably would accommodate both industrial and military needs.

SUMMARY OF THE INVENTION

The present invention provides filtering media with very broad filtering capabilities. The filtering media are particularly suitable for primary application in personal respiratory protection to remove a broad range of toxic gases and vapors as found in industrial environments and also chemicals used as chemical warfare agents. The filtering media successfully achieve performance levels mandated both by applicable industrial filter approval specifications and by internationally recognized military filter performance specifications. The present invention preferably relates to treatments applied to activated carbon in order to improve the ability of the activated carbon to remove low boiling point toxic gases. In preferred applications, the resultant filtering media are used to filter breathing air in connection with respiratory protective equipment. However, the utility of the present invention is not limited to respiratory protective equipment, but also can be used for purifying air or other gases in connection with industrial processes.

The broad capabilities of the filtering media allow construction of filters which can be used in a wide variety of applications, including being fitted onto a face-mask, or being fitted singly or in multiples onto a powered air purifying respirator system. One such powered system is commercially available under the trademark "BREATHE-EASY" from the Minnesota Mining and Manufacturing Company (3M).

Advantageously, the filtering media not only provide broad spectrum filtering performance, but do so while being compact and convenient to use. For example, filtering media of the present invention may be incorporated into the same housings and canisters as are being used in current, commercially available filter systems. Broad spectrum performance and convenience are achieved while also maintaining excellent air flow characteristics. Airflow resistance of the present filtering media easily meet current industrial and military specifications.

Because of the broad spectrum filtering characteristics, the filtering media of the present invention allow personnel to respond to and be involved in ancillary activities associated with chemical incidents in which the precise type of chemical present is not known or predictable ahead of time. This response flexibility avoids the need to maintain a large inventory of different filters. In many circumstances, the use of the filter media allows responsive action to be taken without delay, because the broad spectrum protection provided by the filtering media can reduce the urgency first to analyze the chemical(s) at issue, identify the chemicals, then select an appropriate filter, and only then respond to the hazard.

Preferably, the filtering media of the present invention may be used in conjunction with a high efficiency particulate filter in order to provide combined protection against gas, vapor and particulate contamination.

In one aspect, the present invention relates to a filter medium that includes at least two kinds of filter media particles. A first plurality of filter media particles includes an extended surface area substrate comprising at least one transition metal impregnant. A second plurality of filter media particles includes an extended surface area substrate comprising at least one amine impregnant. In preferred embodiments, at least one and preferably both of the kinds of filter media particles is/are substantially free of chromium, and more preferably contain no detectable chromium.

It has now been discovered that the presence of the amine on one kind of filter media particles boosts the performance of impregnants on the other kind of filter media particles and vice versa beyond what would be expected. For instance, if one kind of particle provides a certain level of protection against a chemical agent, but a second kind of particle has little if any efficacy against that agent, it might be expected that combining the two different kinds of particles would provide little if any extra protection against that same agent. Yet, the combinations of the present invention provide a higher level of performance than would be expected by such reasonable logic. As an example of the beneficial effects provided by the present invention, ammonia lifetime of a filtering media is dramatically lengthened by as much as 50% by using a tertiary amine impregnated activated carbon in combination with an impregnated, activated carbon having ammonia protection capabilities. This boost is unexpected inasmuch as a tertiary amine impregnated carbons by themselves tend to offer little if any protection against ammonia.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF THE PRESENTLY PREFERRED EMBODIMENTS

Figure 1:
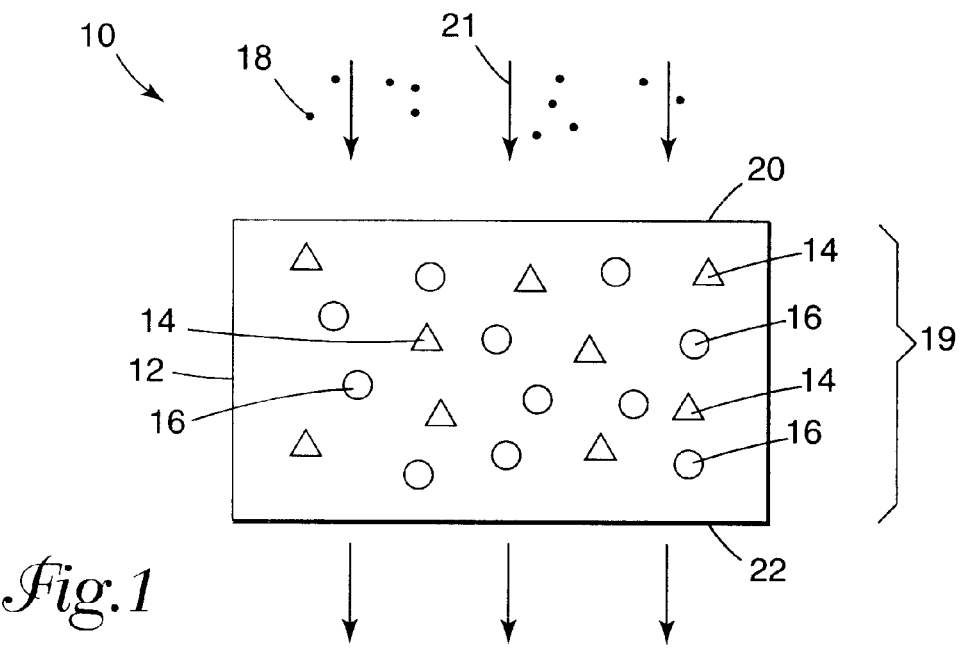
FIG. 1 is a schematic illustration of one filtering system of the present invention.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Filter media of the present invention generally include first and second pluralities of filter media particles. Each plurality of particles independently includes one or more impregnants (described further below) incorporated onto one or more extended surface area substrate particles. The term "extended surface area substrate particles" means particles in which the surface is sufficiently convoluted or porous, preferably at a microscopic level, such that the particles are capable of being impregnated with at least 5%, more preferably at least 10% by weight of a $CuCl_2$ salt. Suitable extended surface area substrate particles tend to have specific surface areas of at least about 85 $m^2/g$, more typically at least about 500 $m^2/g$ to 2000 $m^2/g$, and preferably about 900 $m^2/g$ to about 1500 $m^2/g$. Representative examples of extended surface area substrate particles include activated carbon, zeolite, alumina, silica, catalyst supports, combinations of these, and the like. The substrate particles for the first and second pluralities of filter media particles may be the same or different.

The extended surface area substrate particles may have any of a wide range of sizes. Substrate particle size in the filter industry generally is expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Filter particles characterized by a mesh size of 12×30 would include a population of particles having a diameter in the range from about 0.5 mm to about 1.5 mm.

Selecting an appropriate mesh size for the substrate particles involves balancing density and filter capacity against air flow resistance. Generally, a finer mesh size (e.g., smaller particles) tends to provide not only greater density and filter capacity, but higher air flow resistance. Balancing these concerns, "a" is typically in the range of 5 to 20 and "b" is typically 15 to about 40 with the proviso that the difference between a and b is generally in the range from about 5 to about 30. Specific mesh sizes found to be suitable in the practice of the present invention include 12×20, 12×30, and 12×40.

The first plurality of substrate particles incorporates at least one impregnant comprising a transition metal. Examples of such impregnant materials include compounds containing Cu, Zn, Mo, Cr, Ag, Ni, V, W, Co, combinations thereof, and the like. However, because the hexavalent form of Cr has been identified as a potential carcinogen, the first plurality of filter media particles preferably includes no detectable amounts of Cr (VI), and more preferably no detectable Cr of any valence state due to the risk that other forms of Cr, e.g., Cr(IV) could be oxidized to Cr(VI). The metals may be in metallic form, but more typically are impregnated as salts.

The selection of which one or more transition metal compounds to incorporate into the first plurality of filter media particles depends upon the desired range of filtering capabilities inasmuch as each of the various transition metals tend to provide protection against particular air contaminants. For example, Cr. Mo, V, and Y or W independently help to filter gases such as cyanogen chloride and hydrogen cyanide from air streams when used in combination with a Cu impregnant. Representative filter media particles may include 0.1 to 10 weight percent of one or more impregnants including Mo, V, W, and/or Cr. Due to the potential toxicity of Cr, the use of Mo, V, and/or W materials are preferred. Throughout this specification and accompanying claims, weight percent is based upon the total weight of the impregnated particles.

Cu tends to help filter many gases such as HCN, $H_2S$, acid gases, and the like from air streams. Representative filter media particles may include 0.1 to 15 weight percent of one or more impregnants including Cu.

Zn in various forms tends to help filter HCN, cyanogen chloride, cyanogen, and $NH_3$ from air streams. Representative filter media particles of the present invention may include 1 to 20 weight percent of one or more impregnants including Zn.

Ag tends to help filter arsenical gases from an air stream. Ag functions catalytically and generally is not consumed during filtering operations. Accordingly, filter media particles may include relatively small catalytic amounts, e.g., about 0.01 to 1, preferably 0.1 weight percent, of one or more Ag-containing impregnants.

Ni and Co each independently helps to filter HCN from air streams. Representative filter media particles may include 0.1 to 15 weight percent of one or more Ni containing impregnants and/or Co containing impregnants.

In addition to one or more impregnants that contain transition metals, the first plurality of substrate particles may optionally include one or more other kinds of impregnants. For example, ammonia or ammonium salts in the impregnating solution not only help to improve the solubility of transition metal compounds during the manufacture of the particles, but remaining adsorbed quantities also help to remove acid gases from air streams. Sulfate salts are believed to help to control the pH during usage of filter media. Ammonium sulfate, for instance, when impregnated on a substrate such as carbon and dried at 145° C. forms an acid sulfate. Acid sulfate is sufficiently acidic to react with ammonia to facilitate removal of ammonia from a flow of air or other gas. Through impregnation and drying, strongly acidic ammonium salts impregnate the carbon during the drying process without damaging the basic oxide/hydroxide impregnant being formed. This results in enhanced ammonia service life of a cartridge containing the resultant impregnated carbon. Representative filter media particles may include 0.1 to 10, preferably 2.5 to 4.5 weight percent of sulfate. Moisture beneficially helps to remove acid gases from air streams;. Optionally, therefore, the first plurality of filter media particles may include up to about 15 weight percent, preferably about 6 to 12 weight percent of water.

Impregnants may be incorporated into the first plurality of substrate particles in accordance with conventional practices. Such impregnants are typically provided as salts, oxides, carbonates, or the like and are impregnated via solution processing, sublimation processing, fluidized bed processing, and the like. Representative techniques for such processing have been widely described in the literature, including the patent and literature documents cited in the Background section herein.

For broad spectrum filtering performance, a particularly preferred first plurality of filter media particles comprises an activated carbon substrate impregnated with 6 to 13 weight percent of a Cu containing impregnant, 0 to 10 weight percent of a Zn containing impregnant, and 1 to 4 weight percent of a Mo containing impregnant. Particularly preferred filter media particles further comprise not only Cu, Zn and Mo containing impregnants but also one or more of 2.5 to 4.5 weight percent sulfate salt, and/or 1 to 25 weight percent water. Such filter media particles are described in U.S. Pat. No. 5,492,882. A specific embodiment of such particles is commercially available under the trade designation "Calgon URC" from Calgon Carbon Corporation.

Another preferred first plurality of filter media particles comprises an activated carbon substrate incorporating 1 to 10 weight percent of a zinc containing impregnant, e.g., $ZnCl_2$ and optionally moisture in the range of 1 to 15, preferably 9 to 12 weight percent. A specific example of filter activated carbon impregnated with zinc chloride is commercially available under the trade designation "C-Chem Chemsorb 620" from C*Chem, a division of Ionex Corp.

The second plurality of filter media particles generally comprises one or more extended surface area substrate particles incorporating one or more amine impregnants, preferably one or more tertiary amine impregnants. When used in combination with the first plurality of filter media particles, the second plurality of filter media particles incorporating the amine impregnant provide numerous benefits. Firstly, the amine-containing particles help to remove cyanogen chloride (CK) from air or other gases. Additionally, it has now been discovered that the presence of the second plurality of filter media particles unexpectedly boosts the performance of the first plurality of filter media particles and vice versa. Practically, this means that filter media of the present invention need less material to achieve a given level of filtering performance. This, in turn, allows filters with broad capabilities to be made that are characterized by small, compact size, lower breathing resistance, less weight, and more comfort as compared to conventional filters to be used for removal of the same range of contaminants.

As an example of one observed performance boost, using a filter system whose capacity for filter media particles is filled with both kinds of filter media particles (either in discrete filter beds and/or intermixed together) can enhance ammonia removal lifetime by up to 50% in preferred embodiments as compared to the same system whose capacity for filter media particles is filled with only one kind of filter media particle. The ability of a combination of filter media particles to provide enhanced ammonia removal capabilities is unexpected inasmuch as the amine impregnants, by themselves, generally tend to have little if any ammonia removal capability. A combination comprising both kinds of filter media particles also has been observed to provide significantly better organic vapor and CK performance as compared to otherwise identical filter systems containing only one kind of filter media particle. This boost in performance has also been observed for other gases and vapors.

The one or more extended surface area substrate particles of the second plurality of filter media particles may be independently selected from any of the extended surface area substrate particles as described above with respect to the first plurality of filter media particles. The extended surface area substrate particles used in the first and second pluralities of filter media particles may be the same or different. Other than the amine impregnating the second plurality of filter media particles, other impregnants on the first and second pluralities of filter media particles may be the same or different.

A wide range of amine impregnants may be beneficially incorporated into the second plurality of filter media particles. Suitable amines may be monomeric, oligomeric, or polymeric. Preferred amines are either a solid or liquid at room temperature. Preferred amines provide CK, methyl bromide, and/or methyl iodide removal capability. Representative examples of suitable amines include triethylenediamine (TEDA), triethylamine (TEA), pyridine, pyridine-4-carboxylic acid (P4CA), combinations of these, and the like. Of these, TEDA is most preferred.

The amount of amine incorporated into the second plurality of filter media particles may vary within a wide range. Generally, if too little is used, the CK lifetime of the resultant media may be below what is desired. Additionally, if too little amine is used, a synergistic boost in filtering capabilities (e.g., organic vapor, CK, and ammonia lifetime), may not be observed when used in combination with other kinds of particles. On the other hand, using too much amine may tend to degrade unduly the capacity of the filter media particles to remove organic vapors from air or other gases. Additionally, above some impregnation level, little additional benefit may be observed by the use of more amine. Balancing these concerns, the second plurality of filter media particles generally comprises 0.5 to 15, more preferably 1 to 5 weight percent of amine based upon the total weight of the second plurality of filter media particles.

In addition to the amine, the second plurality of filter media particles optionally may comprise one or more other impregnants such as those described above with respect to the first plurality of filter media particles. For instance, one preferred embodiment of the second plurality of filter media particles comprises an activated carbon substrate impregnated with 2 to 6 weight percent Cu, 0.03 to 1 weight percent Ag, 1 to 10 weight percent Zn, 1 to 6 weight percent Mo, and 1 to 3.5 weight percent TEDA. A specific example of such a carbon is commercially available under the trade designation "Calgon-ASZM-TEDA" from Calgon Carbon Corp. It is particularly desirable to use this particular type of filter media particle as at least a portion of the second plurality of filter media particles in combination with a Zn and moisture impregnated activated carbon such as the "C-Chem Chemsorb 620" filter media particles as at least a portion of the first plurality of substrate particles.

Another preferred embodiment of the second plurality of filter media particles comprises an activated carbon substrate impregnated with 0.5 to 10 weight percent of a tertiary amine such as TEDA and optionally 0.5 to 5, preferably 3 to 5 weight percent of moisture. Such an activated carbon impregnated with TEDA but being substantially free of other impregants except for moisture provides good filtering capabilities for CK and organic vapors inasmuch as other impregnants are not present to occupy surface area of the carbon that otherwise can be used for storing the amine and/or adsorbing organic vapors during filtering operations. A specific example of an activated carbon impregnated with only TEDA is commercially available under the trade designation "Pica Nacar- B" from Pica USA, Inc. It is particularly desirable to use this type of filter media particle in combination with a broad spectrum filtering media such as the "Calgon URC" filter media particles which include activated carbon impregnated with Cu, Zn, Mo, sulfate, ammonium, and water.

Another preferred embodiment of the second plurality of filter media particles is made by impregnating an amine such as TEDA onto extended surface area substrate particles in combination with at least two other, preferably at least three other, impregnants. These impregnants may be incorporated onto the substrate particles simultaneously, or in any desired order. For example, such filter media particles may be provided by incorporating an tertiary amine impregnant such as TEDA onto the "Calgon URC" filter media particles such that the finished product incorporates Cu, Zn, Mo, sulfate, ammonium, water, and the amine. Such impregnation may be carried out using any desired impregnation technique. However, when the amine is TEDA, which is normally a solid at room temperature, impregnation of TEDA onto the particles preferably is accomplished using a sublimation technique such as is described below.

If a desired kind of amine-impregnated filter media particle is not commercially available, a variety of techniques are available for impregnating an amine onto extended surface area particles. These include, for example, solution impregnation, a fluidized bed method (Ro et. al, U.S. Pat. No. 5,792,720), and a low pressure sublimation method (Liang et. al. U.S. Pat. No. 5,145,820). When a solid such as TEDA is to be impregnated onto substrate particles that already include other impregnants, solution impregnation can wash away the other impregnants. To avoid loss of the other impregnants, impregnation in such circumstances is preferably carried out using sublimation techniques.

According to a preferred approach for using sublimation to impregnate an amine onto substrate particles, a rotary vacuum apparatus (standard commercial equipment available from sources such as Paul O. Abbé Corp.) is used. The rotary vacuum drier available from the Paul O. Abbé Corp. is a vessel in the shape of two cones base to base. The vessel can be rotated about an axis extending generally across the bases of the cones. The apparatus includes an interior nozzle through which liquids can be sprayed into the vessel, if desired. The vessel is double walled and may be heated via a hot fluid such as steam or oil which runs inside of the double walls. The interior of the vessel can also be connected to a vacuum pump or the like to lower the internal pressure. A condensation system is included to recapture vaporized material, if desired, although this feature generally applies to liquid or solution impregnated rather than sublimination.

To carry out sublimation, the substrate particles to be impregnated are placed into the vessel along with the desired amount of solid amine. For example, to impregnate 5 weight percent TEDA onto an activated carbon substrate, about 5 parts by weight TEDA and 95 parts by weight of the carbon substrate would be placed into the vessel. The vessel may then be rotated for a sufficient period under conditions effective to allow the amine be intimately dispersed with the carbon particles, but not so long as to cause excessive grinding or crushing of the carbon particles. Sublimation may be carried out under a wide range of temperatures, pressures, and times. As suggested guidelines, sublimation may occur at a temperature in the range from about ambient up to but not exceeding the melting point of the amine. In the case of TEDA, this is preferably 30° C. to about 75° C., more preferably about 50° C. The pressure may be 0.01 to about 2, preferably 0.5 to 1, more preferably about 0.1 atmospheres. The sublimation operation may be carried out for a time period ranging from 1 minute to 72 hours, preferably 2 hours to 48 hours, more preferably about 24 hours.

Filter media of the present invention may include one, two, or more layers in which the first and second plurality of filter media particles are intermixed and/or disposed in separate filter bed layers. The relative amounts of each kind of filter media particles can vary over a wide range. As general guidelines, the ratio of the first plurality of filter media particles to the second plurality of filter media particles is in the range of 1:19 to 19:1, preferably 1:5 to 5:1, more preferably about 1:1.

As an option, in addition to the first and second pluralities of filter media particles, the filter media of the present invention may further comprise one or more additional pluralities of filter media particles. For example, a filter medium embodiment of the present invention may optionally include three, four, or more pluralities of filter media particles that may be intermixed in a single filter bed or layered in respective filter beds. If layered, one or more of such layers may include respective combinations of such filter media particles that are intermixed. For example, one specific embodiment of a filter with three filter beds may include a first filter bed comprising the "URC" impregnated carbon available from Calgon Carbon Corp., a second filter bed comprising an amine (preferably TEDA) impregnated carbon, and a third filter bed comprising an activated carbon having no impregnants except for optional moisture.

FIG. 1 schematically illustrates a filter system 10 comprising filter canister 12 in which first plurality of filter media particles 14 are intermixed with second plurality of filter media particles 16 in a single filter bed layer 19. A stream of air 21 including one or more contaminants 18 enters filter canister 12 through inlet side 20, is filtered as it passes through filter bed layer 19, and then exits through outlet side 22.

Figure 2:
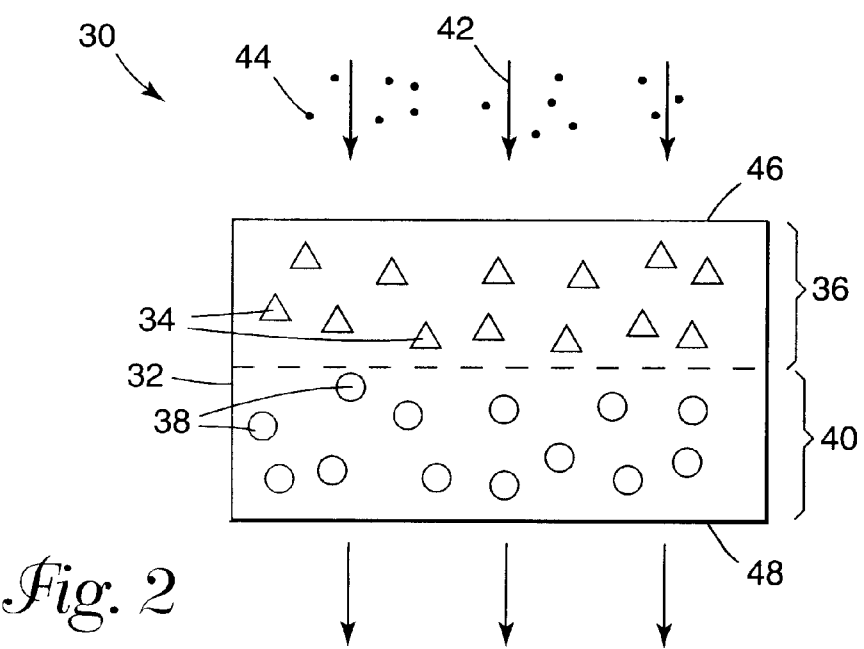
FIG. 2 is a schematic illustration of another embodiment of a filtering system of the present invention.

Alternatively, the two kinds of filter media particles can be positioned in separate filter bed layers. For example, FIG. 2 schematically illustrates a filter system 30 comprising filter canister 32 in which a first plurality of filter media particles 34 is positioned in filter bed 36. Second plurality of filter media particles 38 is positioned in filter bed 40. A stream of air 42 including one or more contaminants 44 enters filter canister 32 through inlet side 46, is filtered as it passes through filter beds 36 and 40, and then exits through outlet side 48.

In FIG. 2, first plurality of filter media particles 34 is in bed 36 proximal to inlet side 46, while second plurality of filter media particles 38 (containing the amine such as TEDA) is in bed 40 distal from inlet side. This particular order of particles 34 and 38 is preferred in instances in which particles 34 might have some residual ammonia in them. The body of particles 38, being downstream from such particles 34, will help filter out such ammonia in the event the ammonia were to outgas from particles 34. Otherwise, the placement of particles 34 and 38 in beds 36 and 40 is interchangeable as desired.

Figure 3:
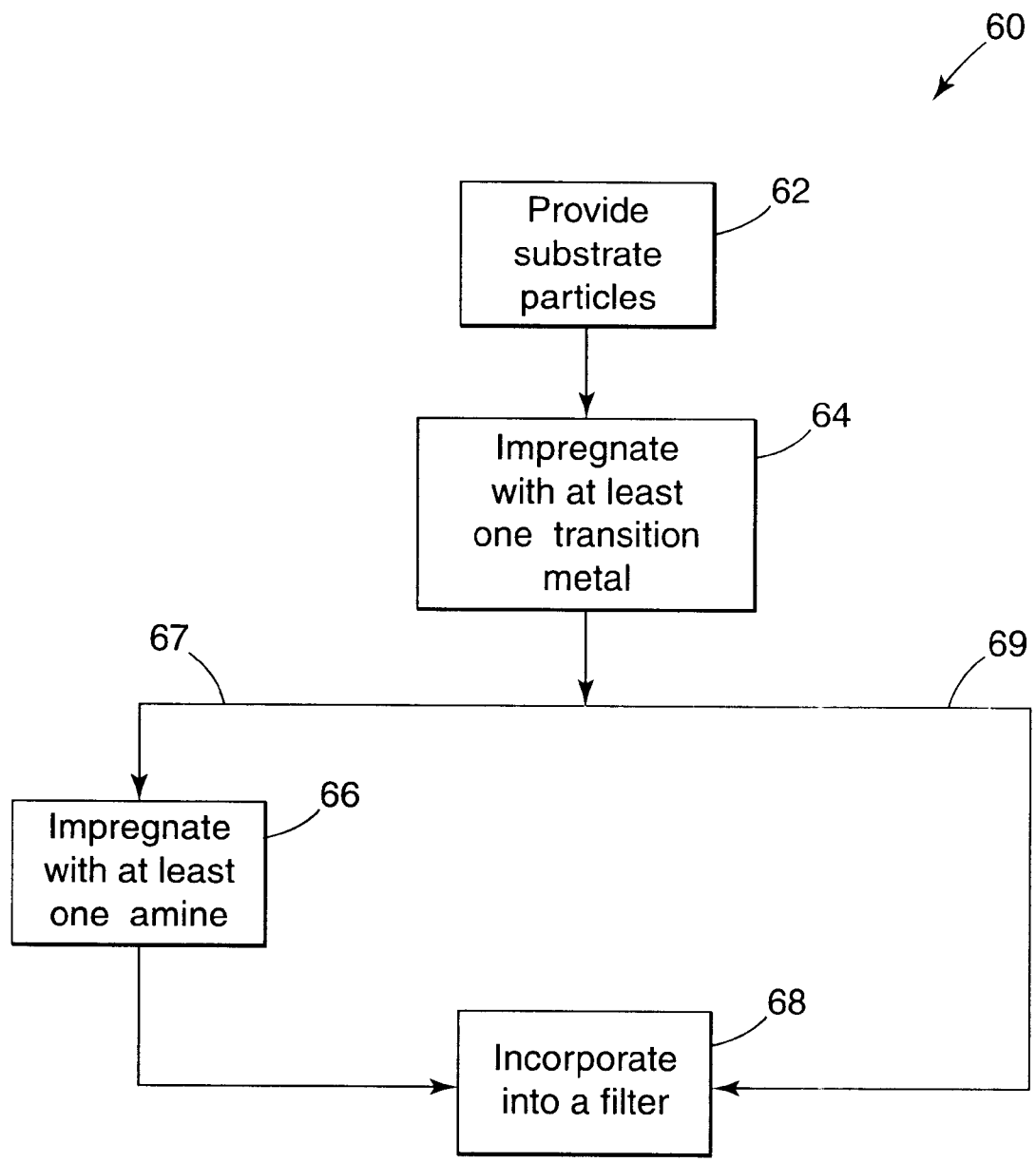
FIG. 3 is a schematic flow chart showing one approach for making a filter of the present invention.

FIG. 3 is a schematic flowchart of one approach 60 for incorporating a combination of filter media particles into a filter. In step 62, a plurality of substrate particles having an extended surface area are provided. In step 64, these substrate particles are impregnated with at least one transition metal. The resultant impregnated particles are then divided into two portions, 67 and 69 respectively. In step 66, portion 67 is impregnated with at least one amine. Thus, the two kinds of filter media particles are identical except that one portion is impregnated with an amine while the other is not. In step 68, the amine-impregnated portion 67 and the other portion 69 are combined into a filter. As desired, the two kinds of filter media particles can be intermixed and/or layered in filter beds.

Figure 4:
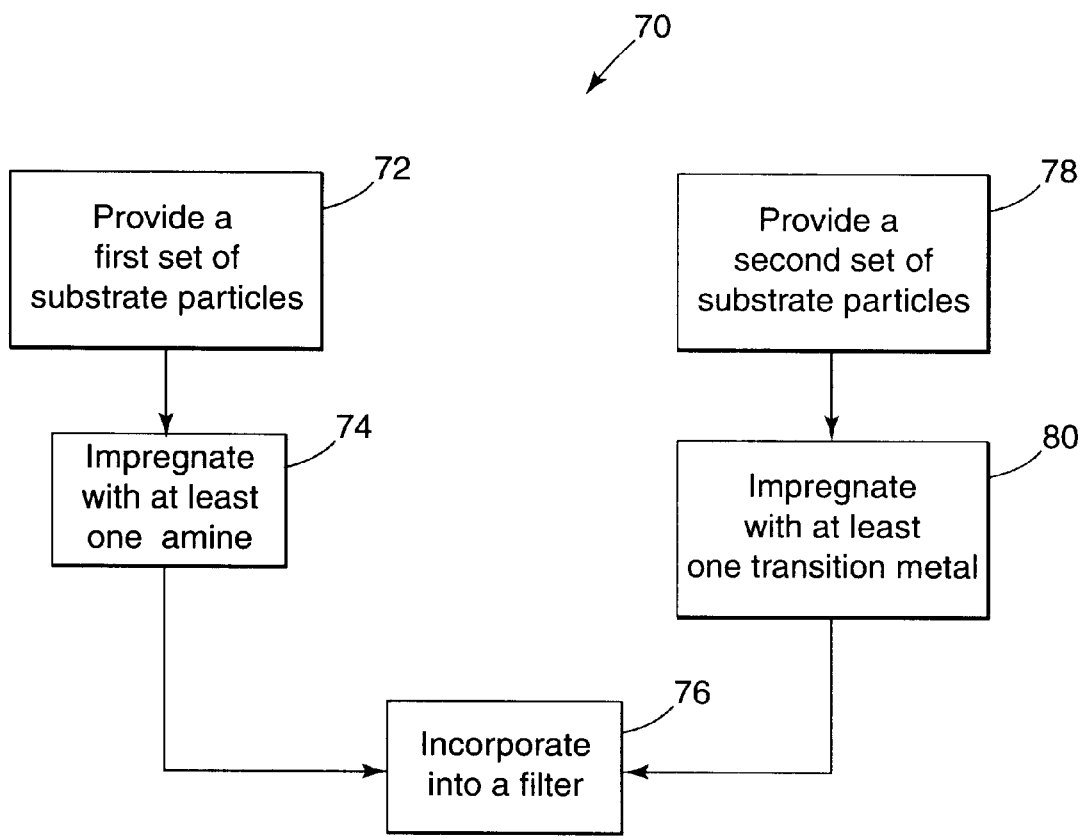
FIG. 4 is a schematic flow chart showing another approach for making a filter of the present invention.

FIG. 4 is a schematic flowchart of another approach 70 for incorporating a combination of filter media particles into a filter. In step 72, a plurality of substrate particles having an extended surface area are provided. In step 74, these particles are impregnated with impregnants comprising an amine. In the meantime, in step 78, another plurality of substrate particles having an extended surface area (these base particles may be the same or different than those provided in step 72) is provided. These are impregnated with one or more impregnants comprising at least one transition metal in step 80. The filter media particles resulting from steps 74 and 80 are then incorporated in combination into a filter in step 76. As desired, the two kinds of filter media particles can be intermixed and/or layered in filter beds.

The present invention will now be further described with reference to the following examples.

EXAMPLE 1

Filter Media particles

Throughout these examples, Filter Media Particles #1 were an activated carbon impregnated with copper, zinc, molybdenum, ammonium, sulfate salt, and water. This material was obtained commercially as a 12×30 mesh size, type "URC" carbon from Calgon Carbon Corp.

Filter Media Particles #2 were a coconut shell base carbon impregnated with 5 weight percent TEDA. This material was obtained commercially as a 12×20 mesh size, "NACAR B" carbon from Pica USA, Inc. (formerly North American Carbon).

Filter Media Particles #3 were prepared by impregnating Filter Media Particles #1 with 2.5 weight percent of TEDA via sublimation in a rotary vacuum apparatus. Sublimation was carried out at 50° C. and 0.1 atm for a period of about 24 hours.

Filter Media Particles #4 were an activated carbon impregnated with Cu, Zn, Mo, Ag, and TEDA. This material was obtained commercially as 12×30 mesh size, type "ASZM-TEDA" carbon from Calgon Carbon Corp.

Filter Media Particles #5 were an activated carbon impregnated with zinc chloride and believed to contain 9 to 12 weight percent moisture. This material was obtained commercially as 12×20 mesh size, type "620 G12" carbon from Ionex Corp. (C*Chem division).

EXAMPLE 2

Method of Making Filter Samples

To make filter samples, Filter Media Particles #1, #2, #3, #4, and/or #5, as appropriate, were filled into filter bodies by the method of snowstorm filling. In this method, particles are poured down a tube with cross-wires located to ensure that the carbon falls evenly and packs into the container to as high a packing density as practical. The containers used were cylindrical plastic bodies of appropriate volume. At the bottom of each container body was a disc with holes in it. A non-woven fabric filter layer was applied over the top of this to retain the carbon but to allow airflow and prevent dust escape. After particle filling, a non-woven fabric filter was ultrasonically welded to an upper disc with holes in it. This disc assembly was then stake welded over the top surface of the filter bed(s). The filter fabrication was completed by incorporation of a high efficiency, glass-fiber based particulate filtering element on the inlet side of the filter. This element is used to impart the capability for removal of solid and liquid aerosols from an air or other gas stream. This capability is useful for individual protection applications.

EXAMPLE 3

Test Standards and Testing

The performance of filters described in these examples were tested according to NIOSH approval requirements and unclassified (1973) NATO military specifications. This does not preclude the suitability of the described design types to meet other industrial or military standards, either as is or with variation of the ratio of carbon fills or levels of impregnation.

NIOSH standards are defined in the formal document appearing at Title 42, Chapter 84 of the Code of Federal Regulations (42 CFR 84) for negative pressure use, and in an amending letter for powered air use. The unclassified NATO military standard (Triptych AC/225 (Panel VII) D/103 (Rev.)) is defined formally only for negative pressure equipment, and the standard was adapted for powered air use by testing at higher airflows in these examples.

Filters constructed from the various filter media particles were tested in a system that generates a constantly flowing stream of humid air under controlled temperature, pressure, and humidity conditions. A liquid contaminant was evaporated into this airstream for a vapor test, or a gas contaminant was metered into the stream via a flow controller for a gas test. The resultant airstream containing the contaminant was then fed to the test filter body which was mounted in a chamber. The system has an appropriate method of sampling the challenge airstream to establish the applied concentration of contaminant in the airstream. An analyser of a type appropriate to the test gas is located downstream from the filter to measure the concentration of the contaminant in the effluent air from the filter. For the requirements of industrial and military tests, the time taken for the concentration of test agent in the effluent to reach a prescribed value was measured. According to the applicable standard, this time for contaminant concentration in the effluent to reach the prescribed value must exceed a minimum time in order for the test result to be considered a pass.

For some test conditions given here, filters were subjected to pre-treatments before testing. Each pre-treatment comprised exposing certain filters in a set before testing to a flowing stream of humid air at levels representing high or low humidities in real usage. The exposure was conducted at different flow rates according to whether the filter was intended for a negative pressure or positive pressure application. In each case, pre-treatment occurred for a 6 hour period. Those filters not pre-treated are designated "as received" in the tables below. For certain military applications, there was pre-humidification at a level representing high humidity up to constant weight uptake of the filter. Another pre-treatment involved a vertical shock test according to European test requirements in which the complete filters are laid with the inlet to outlet axis in horizontal position so that they can move slightly but are not free to roll around. This box sits on a heavy metal tray which is lifted up by a motor-driven cam through an upward displacement of 2 cm and allowed to drop under gravity. The lift and drop is connected at a rate of 100 cycles per minute for twenty minutes. The procedures provides a test of the physical integrity of a filter.

In the tables throughout this specification, the following pre-treatment codes are used in the Tables containing test conditions and results:

1. Filter tested as received
2. Filter tested after passage of air at 25±5% R.H., 25±2.5° C. at 45 or 57 liters per minute for 6 hours according to the test flow
3. Filter tested after passage of air at 85±5% R.H., 25±2.5° C. at 45 or 57 liters per minute for 6 hours according to the test flow
4. Filter tested after passage of air at 80±5% R.H., 24±3° C to constant weight uptake 5. Vertical shock rough handling with 2 cm displacement at 100 cycles per minute for 20 minutes on canisters mounted with inlet-outlet axis in a horizontal position.

EXAMPLE 4

Layered Filter Bed: Sample A

A filter bed was prepared in which the lower, outlet filter bed included 155 $cm^3$ of Filter Media Particles #2 and an upper filter bed 150 $cm^3$ of Filter Media Particles #1. This filter was tested for compliance with NIOSH approvals testing requirements for two or three filters on a powered air purifying respirator system and the unclassified NATO military specification at the same flow rates. This equated to filter testing at 57 liters per minute (LPM) per filter. The results are reported in Table IA and IB, below. (A for industrial conditions, B for military conditions).

EXAMPLE 5

Layered Filter Bed: Sample B

A filter was prepared as in Example 4, except that the lower filter bed included 125 $cm^3$ of Filter Media Particles #2 and the upper filter bed included 125 $cm^3$ of Filter Media Particles #1. This filter was tested for compliance with NIOSH approvals testing requirements for twin filter use on a powered air purifying respirator blower with an output of 90 LPM. Filters were therefore tested at 45 LPM each.

1. The results of the tests are given in Table Tables 1A-1, 1A-2, 1A-3 and IB (A for industrial conditions, B for military conditions).

For some tests, multiple runs were carried out. Results for each trial, separated by a comma, are listed. A ">" before a result indicates that the test was stopped at the indicated time without the concentration of the contaminant at issue in the reaching filter effluent the breakthrough concentration specified in the standard.

TABLE IA-1

NIOSH Test Conditions and Results for Organic Vapor and Acid Gas

| Test | Agent | Concentration (ppm) | Break Conc. (ppm) | Pre-Conditioning | test Hunidity (% R.H.) | Required Required Lifetime (minutes) | Sample A Lifetime (minutes) 57 LPM | Sample B Lifetime (minutes) 45 LPM |
|---|---|---|---|---|---|---|---|---|
| Organic Vapor | Carbon Tetrachloride | 1,000 | 5 | 1 | 50 | 25 | 134, 133, 134 | 123, 124, 126 |
|  |  |  |  | 2 | 50 | 12.5 | 134, 137 | 119, 119 |
|  |  |  |  | 3 | 50 | 12.5 | 17, 19 | 15, 18 |
| Acid Gas | Chlorine | 500 | 5 | 1 | 50 | 17.5 | 99, 103, 104 | 216, 269, >270 |
|  |  |  |  | 2 | 50 | 9 | 103, 105 | >265, 295 |
|  |  |  |  | 3 | 50 | 9 | 136, 133 | 243, >80 |
|  | Sulphur Dioxide | 500 | 5 | 1 | 50 | 15 | 290, >60, >64 | 150, 189, 219 |
|  |  |  |  | 2 | 50 | 7.5 | >193, >72 | 126, 137 |
|  |  |  |  | 3 | 50 | 7.5 | >71, >67 | 96, 99 |
|  | Hydrogen Chloride | 500 | 5 | 1 | 50 | 25 | >65, >67, >57 | >81, >266, >289 |
|  |  |  |  | 2 | 50 | 12.5 | >38, >40 | >85, >121 |
|  |  |  |  | 3 | 50 | 12.5 | >46, >47 | >70, >410 |

TABLE IA-2

NIOSH Test Conditions and Results for Alkaline Gases

| Test | Agent | Concentration (ppm) | Break Conc. (ppm) | Pre-Conditioning | test Hunidity (% R.H.) | Required Required Lifetime (minutes) | Sample A Lifetime (minutes) 57 LPM | Sample B Lifetime (minutes) 45 LPM |
|---|---|---|---|---|---|---|---|---|
| Alkaline Gas | Ammonia | 1,000 | 25 | 1 | 50 | 25 | 34, 32, 34 | 30, 40, 43 |
|  |  |  |  | 2 | 50 | 12.5 | 32, 32 | 29, 32 |
|  |  |  |  | 3 | 50 | 12.5 | 46, 47 | 40, 45 |
|  | Methylamine | 1,000 | 10 | 1 | 50 | 12.5 | 66, 59, >41 | 48, 48, 52 |
|  |  |  |  | 2 | 50 | 6 | 58, 55 | 48, 49 |
|  |  |  |  | 3 | 50 | 6 | 93, 89 | 78, 79 |

TABLE IA-3

NIOSH Test Conditions and Results for Other Contaminants

| Test | Agent | Concentration (ppm) | Break Conc. (ppm) | Pre-Conditioning | test Hunidity (% R.H.) | Required Required Lifetime (minutes) | Sample A Lifetime (minutes) 57 LPM | Sample B Lifetime (minutes) 45 LPM |
|---|---|---|---|---|---|---|---|---|
| Other | Formaldehyde | 100 | 1 | 1 | 50 | 50 | 211, 208, 180 | 164, 200 |
|  |  |  |  | 2 | 25 | 50 | 228, 227 | 131, 220 |
|  |  |  |  | 3 | 85 | 50 | 219, >184 | >141, >239 |
|  | Chlorine Dioxide | 500 | 0.1 | 1 | 50 | 30 | >60, >60, >60 | not tested |
|  |  |  |  | 2 | 25 | 30 | >60, >60 | not tested |
|  |  |  |  | 3 | 85 | 30 | >60, >60 | note tested |
|  | Hydrogen | 70 | 3 | 1 | 50 | 30 | >660, >390, >90 | >60, >60, >60 |

TABLE IA-3-continued

NIOSH Test Conditions and Results for Other Contaminants

| Test | Agent | Concentration (ppm) | Break Conc. (ppm) | Pre-Conditioning | test Hunidity (% R.H.) | Required Required Lifetime (minutes) | Sample A Lifetime (minutes) 57 LPM | Sample B Lifetime (minutes) 45 LPM |
|---|---|---|---|---|---|---|---|---|
| | Fluoride | | | 2 | 25 | 30 | >90, >180 | >60, >60 |
| | | | | 3 | 85 | 30 | >90, >120 | >60, >60 |
| | Phosphine | 1,500 | 0.3 | 1 | 50 | 12 | >24, >24, >24 | >24, >24, >24 |
| | | | | 2 | 25 | 12 | >24, >24 | >24, >24 |
| | | | | 3 | 85 | 12 | >24, >24 | >24, >24 |
| | α-Chloro-acetophenone (CN) | 16 | 0.05 | 1 | 50 | 480 | >480, >480, >480 | >480, >480, >480 |
| | | | | 2 | 25 | 480 | >480, >480 | >480, >480 |
| | | | | 3 | 85 | 480 | >480, >480 | >480, >480 |
| | o-Chloro-benzylidene malononitrile (CS) | 3 | 0.05 | 1 | 50 | 480 | >480, >480, >480 | not tested |
| | | | | 2 | 25 | 480 | >480, >480 | not tested |
| | | | | 3 | 85 | 480 | >480, >480 | not tested |

TABLE IB

Military Test Requirements and Results for Powered Air Products

| Test | Agent | Concentration (ppm) | Break Conc. (ppm) | Pre-Conditioning | test Hunidity (% R.H.) | Required Required Lifetime (minutes) | Sample A Lifetime (minutes) 57 LPM | Sample B Lifetime (minutes) 45 LPM |
|---|---|---|---|---|---|---|---|---|
| Blood Gases | Cyanogen Chloride | 2,000 | 2.5 | 4 | 80 | 25 | 26, 27, 29, 29, 31 | 24, 27, 28, 29, 30 |
| | Hydrogen Cyanide | 2,000 | 1 | 4 | 80 | 25 | 33, 34, 35 | >25, >25, >25, >25 |
| Lower Respiratory Tract Irritant | Phosgene | 10,000 | 8 | 1 | 80 | | 28, 28, 29, 29, 31 | 30, 32, 33, 33 |
| | | | | 4 | | | 44, 44, 46, 47, 47 | not tested |
| Sternutator | Chloropicrin | 5,000 | 5 | 4 | 80 | 30 | 65, 66, 68, 70, 74 | 37, 40, 42, 44, 44, 46, 48 |
| Nerve Agent Simulant | Dimethyl methylphosphonate | 3,000 | 0.04 | 1 | — | 59 | 273, 275, 289 | 231, 243, 245, 246, 258, 264, 268 |

It is evident that for most requirements, the performance of filter samples of the present invention far exceed the minimum permitted filter lifetimes. For three of these tests, the difference between the performance of the filter samples and the minimum requirements is smaller than for the other tests. These were:

a. 85% R.H. pre-humidified organic vapor test;

b. "As Received" ammonia test; and c. 80% R.H. pre-humidified cyanogen chloride test.

It is co-incidental that these test chemicals represent three different contaminant removal mechanisms. The organic vapor test represents a measure of the physisorptive capacity of the filter. Ammonia and cyanol,en chloride, respectively, are both removed by chemical reaction with impregnants, but different reactions are involved. It has been found that, if a filter sample passes these three particular tests, the filter sample tends to pass the remaining tests quite easily.

EXAMPLE 6

Mixed Filter Bed: Sample C 125 cm³ of Filter Media Particles #1 and 125 cm³ of Filter Media Particles #2 were intimately mixed and then loaded into a filter body. The fabricated assembly was tested at 45 LPM. The test results are shown in Table II, along with comparable results for Samples A and B for comparison purposes.

TABLE II

Comprable Results for Mixed and Layered Filter Beds
Relevant results from Samples A and B are included for quick reference

| Test | Agent | Concentration (ppm) | Break Conc. (ppm) | Pre-Conditioning | Test Humidity (% R.H.) | Required Lifetime (minutes) | Sample B (Layers) Lifetime (minutes) 45 LPM | Sample C (Mixed) Lifetime (minutes) 45 LPM | Sample A (Layers) Lifetime (minutes) 57 LPM |
|---|---|---|---|---|---|---|---|---|---|
| Organic Vapor | Carbon Tetrachloride | 1,000 | 5 | 3 | 50 | 12.5 | 15, 18 | 16, 17 | 17, 19 |
| Alkaline Gas | Ammonia | 1,000 | 25 | 1 | 50 | 25 | 30, 40, 43 | 31, 33 | 34, 32, 34 |
| Blood Gases | Cyanogen Chloride | 2,000 | 2.5 | 4 | 80 | 25 | 24, 27, 28, 29, 30 | 34, 34 | 26, 27, 29, 29, 31 |

EXAMPLE 7

Comparison Samples

In order to establish that the use of individual elements of this filter design are not individually capable of providing the necessary performance level, respective samples of the Filter Media Particles #1 or #2 were loaded into filter bodies for evaluation of the capability of each type of filter media particle by itself. The following comparison samples were prepared and tested:

Sample D 155 cm$^3$ Filter Media Particles #2 (5% TEDA carbon)

Sample E 150 cm$^3$ Filter Media Particles #1 (URC carbon)

Sample F 305 cm$^3$ Filter Media Particles #2 (5% TEDA carbon)

Sample G 305 cm$^3$ Filter Media Particles #1 (URC carbon)

The results for these Samples as well as Sample A are shown in Table III. The test conditions chosen were the same powered air requirements as those used for Sample A.

Samples C compared with B indicates that intimate mixing provides equivalent performance to separate layers for the most critical tests.

The key benefit of the layered or mixed combination of the two different kinds of filter media particles is seen by comparing the results of Samples A, D and E. Although the lifetime change on combining carbon beds is not necessarily an arithmetic sum of their individual capabilities (3 minute lifetime for all), the observation of an average 18 minute lifetime for the organic vapor test for Sample A is still an unexpected increase. Specifically, although the TEDA carbon appears to have no significant capacity for ammonia by itself, when used in combination with a layer of the URC carbon, the ammonia lifetime contributed by the URC carbon jumps from 22 minutes to 32–34 minutes. A similar synergistic effect is also observed for the cyanogen chloride life contributed by the TEDA impregnated carbon.

TABLE III

Comparison Sample Testing
Relevant results from Sample A included for quick reference

| Test | Agent | Concentration (ppm) | Break Conc. (ppm) | Pre-Conditioning | Test Humidity (% R.H.) | Required Lifetime (minutes) | Lifetimes in minutes of Samples | | | | |
|---|---|---|---|---|---|---|---|---|---|---|---|
| | | | | | | | A (Layers) 57 LPM | D (155 cc TEDA) 57 LPM | E (150 cc URC) 57 LPM | F (305 cc TEDA) 57 LPM | G (305 cc URC) 57 LPM |
| Organic Vapor | Carbon Tetrachloride | 1,000 | 5 | 3 | 50 | 12.5 | 17, 19 | 3, 3 | 3, 3 | 13, 15 | 13, 14 |
| Alkaline Gas | Ammonia | 1,000 | 25 | 1 | 50 | 25 | 34, 32, 34 | (<1)* | 22, 22 | <1, <1 | 67, 69 |
| Blood Gases | Cyanogen Chloride | 2,000 | 2.5 | 4 | 80 | 25 | 26, 27, 29, 29, 31 | 12, 15 | <1, <3 | 47, 49 | <3, <3 |

"<" indicates that filter lifetime was shorter than the time indicated.
*Extrapolated The following observations of the data presented in Tables IA-1, 1A-2, 1A-3, IB, II, and III can be made:

Samples A and B are both capable of meeting NIOSH approval standards and unclassified NATO military requirements at their respective flow rates.

Samples F and G show the performance of a full-sized filter made from the respective component carbons. It can be seen that neither meets the full width of capabilities of the combined approach in the range of chemicals removed, and in the case of the humidified organic vapor test, the capability of the combined filter bed A is not reached by either TEDA or URC impregnated carbon.

EXAMPLE 8

Layered Filter Bed: Sample H

A filter bed was prepared in which the lower, outlet filter bed included 155 cm³ of Filter Media Particles #3 and an upper filter bed 150 cm³ of Filter Media Particles #1.

EXAMPLE 9

Comparison Sample I

A filter bed was prepared by loading 305 cm³ of Filter Media Particles #3 into a filter body.

EXAMPLE 10

Testing of Samples A and H

Samples A and H were tested under the conditions as shown in Table IV. The data for Sample H in Table IV show that the non-TEDA containing layer can be the same base carbon (Filter Media Particles #1) that was used for TEDA impregnation by the method used to create Particles #3. In this case, there appears to be minimal diminution in the humidified organic vapor lifetime, and considerable improvement in the CK lifetime, although the net amount of TEDA present in the filter bed is half that of Example A.

TABLE IV

Testing and Results for Sample H (A shown for comparison)

| Agent | Concentration (ppm) | Break Conc. (ppm) | Pre-Conditioning | Flow Rate (LPM) | Test Humidity (% R.H.) | Required Lifetime (minutes) | Example Layer | Lifetimes in minutes of Examples A 155 cc | H 155 cc |
|---|---|---|---|---|---|---|---|---|---|
| | | | | | | | Upper Layer | URC 150 cc | URC 150 cc |
| | | | | | | | Lower Layer | 5% TEDA 155 cc | URC 2.5% TEDA 155 cc |
| Carbon Tetrachloride | 1,000 | 5 | 3 | 57 | 50 | 12.5 | | 17, 19 | 16, 19 |
| Cyanogen Chloride | 2,000 | 2.5 | 4 | 57 | 80 | 25 | | 26, 27, 29, 29, 31 | 45, 46 |

EXAMPLE 11

Layered Filter Bed, Sample J

A layered filter was prepared in which the lower, outlet filter bed included 80 cm³ of Filter Media Particles #5 and an upper filter bed of 250 cm³ of Filter Media Particles #4.

EXAMPLE 12

Layered Filter Bed, Sample K

A layered filter was prepared in which the lower, outlet filter bed included 45 cm³ of Filter Media Particles #5 and an upper filter bed of 225 cm³ of Filter Media Particles #4.

EXAMPLE 13

Testing of Sample J

Sample J was tested under the following conditions as shown in Tables VA and VB. The industrial test conditions correspond to the NIOSH powered air "Canister" standard for a tight-fitting system, and were conducted at 40 LPM. The same flow rate was used for the military tests to conditions otherwise equivalent to the unclassified NATO standard.

TABLE VA

Industrial Gases

| Test | Agent | Concentration (ppm) | Break Conc. (ppm) | Pre-Conditioning | Test Humidity (% R.H.) | Required Lifetime (minutes) | Example J Lifetime (minutes) 40 LPM |
|---|---|---|---|---|---|---|---|
| Organic Vapor | Carbon Tetrachloride | 5,000 | 5 | 1 | 50 | 12 | 45, 46, 45 |
| | | | | 2 | 50 | 6 | 45, 46 |
| | | | | 3 | 50 | 6 | 11, 12 |
| Acid Gas | Chlorine | 5,000 | 5 | 1 | 50 | 12 | 31, 33, 33 |
| | | | | 2 | 50 | 6 | 36, 37 |
| | | | | 3 | 50 | 6 | 46, 44 |
| | Sulfur Dioxide | 5,000 | 5 | 1 | 50 | 12 | 17, 18, 18 |
| | | | | 2 | 50 | 6 | 15, 17 |
| | | | | 3 | 50 | 6 | 27, 27 |
| | Hydrogen Chloride | 5,000 | 5 | 1 | 50 | 12 | 99, 98, 96 |
| | | | | 2 | 50 | 6 | 87, 90 |
| | | | | 3 | 50 | 6 | 108, 104 |
| Alkaline Gas | Ammonia | 5,000 | 25 | 1 | 50 | 12 | 14, 14, 14 |
| | | | | 2 | 50 | 6 | 11, 10 |
| | | | | 3 | 50 | 6 | 30, 29 |
| Other | Phosphine | 1,500 | 0.3 | 1 | 50 | 12 | >24, >24, >24 |
| | | | | 2 | 25 | 12 | >24, >24 |
| | | | | 3 | 85 | 12 | >24, >24 |
| | α-Chloro-aceto-phenone (CN) | 16 | 0.05 | 1 | 50 | 480 | >480, >480, >480 |
| | | | | 2 | 25 | 480 | >480, >480 |
| | | | | 3 | 85 | 480 | >480, >480 |
| | o-Chloro-benzylidene malononitrile (CS) | 3 | 0.05 | 1 | 50 | 480 | >480, >480, >480 |
| | | | | 2 | 25 | 480 | >480, >480 |
| | | | | 3 | 85 | 480 | >480, >480 |

TABLE VB

Military Tests

| Test | Agent | Concentration (ppm) | Break Conc. (ppm) | Pre-Conditioning | Test Humidity (% R.H.) | Required Lifetime (minutes) | Example J Lifetime (minutes) 40 LPM |
|---|---|---|---|---|---|---|---|
| Blood Gases | Cyanogen Chloride | 2,000 | 2.5 | 4 | 80 | 25 | 145, 153, 164, 171, 171 |
| | Hydrogen Cyanide | 2,000 | 1 | 4 | 80 | 25 | 71, 73, 80 |
| Lower Respiratory Tract Irritant | Phosgene | 10,000 | 8 | 1 | 80 | | 71, 72, 73, 75, 77 77, 81, 81, 84, 85 |
| Sternutator | Chloropicrin | 5,000 | 5 | 4 | 80 | 25 | 89, 93, 98, 104 |
| Nerve Agent Simulant | Dimethyl methylphosphonate | 3,000 | 0.04 | 1 | — | 59 | 302, 320, 325 |

EXAMPLE 14

Testing of Sample K

Sample K was tested under the conditions shown in Table VIA and VIB. The industrial tests correspond to the conditions required in European Norm EN 141, for filters used directly on a face-mask. The military conditions correspond to the elements of US and Canadian military specifications for negative pressure respirator canisters.

TABLE VIA

Industrial Tests (European Requirements)

| Test | Agent | Concentration (ppm) | Break Conc. (ppm) | Pre-Conditioning | Test Humidity (% R.H.) | Required Lifetime (minutes) | Example K Lifetime (minutes) 30 LPM |
|---|---|---|---|---|---|---|---|
| Organic Vapor (A2) | Cyclohexane | 5,000 | 10 | 5 | 70 | 35 | 41, 43 |
| Inorganic Gas (B2) | Chlorine | 5,000 | 0.5 | 5 | 70 | 20 | 38, 38 |
|  | Hydrogen Cyanide | 5,000 | 5 | 5 | 70 | 25 | 42, 42 |
|  | Hydrogen Sulphide | 5,000 | 5 | 5 | 70 | 40 | >62, >64 |
| Acid Gas (E2) | Sulphur Dioxide | 5,000 | 5 | 5 | 70 | 20 | 24, 25 |
| Alkaline Gas (K1) | Ammonia | 5,000 | 25 | 5 | 70 | 50 | 51, 59 |

TABLE VB

Military Tests

| Test | Agent | Concentration (ppm) | Flow Rate (LPM) | Break Conc. (ppm) | Pre-Conditioning | Test Humidity (% R.H.) | Required Lifetime (minutes) | Example K Lifetime (minutes) |
|---|---|---|---|---|---|---|---|---|
| Blood Gases | Cyanogen Chloride | 4,000 | 32 B | 8 | 4 | 80 | 30 | 128, 136 |
| Lower Respiratory Tract Irritant | Phosgene | 20,000 | 30 | 8 | 1 | 80 |  | 25, 32 |
| Sternutator | Chloropicrin | 5,000 | 30 | 5 | 4 | 80 | 25 | 110, 115,* 120, 128 |
| Nerve Agent Simulant | Dimethyl methylphosphonate | 3,000 | 30 | 0.04 | 1 | — | 59 | 201, 206, 207, 208 |

"B" in Flow Rate column indicates that the flow was applied in a cyclic manner to simulate breathing, in this case at 24 cycles per minute. Other test flows are at a constant rate.
*Data are for ASZM-TEDA only extrapolated to this application The data show that a practical product can be obtained when the TEDA is associated with the carbon containing copper, zinc molybdenum and silver, and there is a separate bed of zinc chloride containing carbon.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A filter medium, comprising:
   a first plurality of filter media particles, comprising an extended surface area substrate comprising at least one transition metal impregnant; and
   a second plurality of filter media particles, comprising an extended surface area substrate comprising an amine impregnant.

2. The filter medium of claim 1, wherein at least one of the first and second plurality of filter media particles is substantially free of chromium.

3. The filter medium of claim 1, wherein each of the first and second plurality of filter media particles is substantially free of chromium.

4. The filter medium of claim 1, wherein the first and second plurality of filter media particles are intermixed.

5. The filter medium of claim 1, wherein the filter medium comprises first and second filter media layers;
   the first plurality of filter media particles is positioned in the first filter media layer; and
   the second plurality of filter media particles is positioned in the second filter media layer.

6. The filter medium of claim 1, wherein the amine impregnant comprises TEDA.

7. The filter medium of claim 6, wherein the second plurality of filter media particles comprise 0.1 to 10 weight percent of TEDA.

8. The filter medium of claim 6, wherein the second plurality of filter media particles further comprises Cu, Ag, Zn, and Mo impregnants.

9. The filter medium of claim 6, wherein the second plurality of filter media particles is substantially free of transition metal impregnants.

10. The filter medium of claim 6 wherein the second plurality of filter media particles further comprises Cu, Zn, Mo, ammonium salt, and sulfate salt impregnants.

11. The filter medium of claim 10 wherein the second plurality of filter media particles further comprises up to about 15 weight percent moisture.

12. The filter medium of claim 6, wherein the second plurality of filter media particles further comprises up to about 15 weight percent moisture.

13. The filter medium of claim 8, wherein the first plurality of filter media particles comprises a Zn salt impregnant.

14. The filter medium of claim 10 wherein the first plurality of filter media particles comprises Cu, Zn, and Mo impregnants.

15. The filter medium of claim 1, wherein the first plurality of filter media particles comprises a Zn impregnant, and wherein the second plurality of filter media particles comprises TEDA and Cu, Ag, Zn, and Mo impregnants.

16. The filter medium of claim 1, wherein the first plurality of filter media particles comprises Cu, Zn, and Mo impregnants, and wherein the second plurality of filter media particles comprises TEDA and is at least substantially free of transition metal impregnants.

17. A method of making a filter medium, comprising the steps of:
(a) providing a first plurality of filter media particles, comprising an extended surface area substrate comprising at least one transition metal impregnant, said first plurality of particles being substantially free of a tertiary amine impregnant;
(b) providing a second plurality of filter media particles, comprising an extended surface area substrate comprising a tertiary amine impregnant; and
(c) incorporating the first and second pluralities of filter media particles into at least one filter bed of the filter medium.

18. The method of claim 17, wherein step (c) comprises incorporating the first and second pluralities of filter media particles into a filter bed in which said pluralities are intermixed.

19. The method of claim 17, wherein step (c) comprises incorporating the first plurality of filter media particles into a first filter bed and incorporating the second plurality of filter media particles into a second filter bed.

20. The method of claim 19, wherein the filter medium has an inlet through which a gas enters the filter medium, and outlet through which the gas exits the filter medium, and wherein the first filter bed is proximal to the inlet and the second filter bed is proximal to the outlet.

21. The method of claim 17, wherein at least one of the first and second plurality of filter media particles is substantially free of chromium.

22. The method of claim 17, wherein each of the first and second plurality of filter media particles is substantially free of chromium.

23. The method of claim 17, wherein the amine impregnant comprises TEDA.

24. The method of claim 23, wherein the second plurality of filter media particles further comprises Cu, Ag, Zn, and Mo impregnants.

25. The method of claim 23, wherein the second plurality of filter media particles is substantially free of transition metal impregnants.

26. The method of claim 17, wherein the second plurality of filter media particles further comprises up to about 15 weight percent moisture.

27. The method of claim 23, wherein the second plurality of filter media particles further comprises up to about 15 weight percent moisture.

28. The method of claim 24, wherein the first plurality of filter media particles comprises a Zn salt impregnant.

29. The method of claim 17, wherein the first plurality of filter media particles comprises a Zn impregnant, and wherein the second plurality of filter media particles comprises TEDA and Cu, Ag, Zn, and Mo impregnants.

30. The method of claim 17, wherein the first plurality of filter media particles comprises Cu, Zn, and Mo impregnants, and wherein the second plurality of filter media particles comprises TEDA and is at least substantially free of transition metal impregnants.

31. A method of filtering contaminants from a gas, comprising the step of causing the gas to flow through a filter medium incorporating
(a) a first plurality of filter media particles, comprising an extended surface area substrate comprising at least one transition metal impregnant; and
(b) a second plurality of filter media particles, comprising an extended surface area substrate comprising an amine impregnant.

32. The method of claim 31, wherein step (c) comprises incorporating the first and second pluralities of filter media particles into a filter bed in which said pluralities are intermixed.

33. The method of claim 31, wherein step (c) comprises incorporating the first plurality of filter media particles into a first filter bed and incorporating the second plurality of filter media particles into a second filter bed.

34. The method of claim 33, wherein the filter medium has an inlet through which a gas enters the filter medium, and outlet through which the gas exits the filter medium; and wherein the first filter bed is proximal to the inlet and the second filter bed is proximal to the outlet.

35. The method of claim 31, wherein at least one of the first and second plurality of filter media particles is substantially free of chromium.

36. The method of claim 31, wherein each of the first and second plurality of filter media particles is substantially free of chromium.

37. The method of claim 31, wherein the amine impregnant comprises TEDA.

38. The method of claim 37, wherein the second plurality of filter media particles further comprises Cu, Ag, Zn, and Mo impregnants.

39. The method of claim 37, wherein the second plurality of filter media particles is substantially free of transition metal impregnants.

40. The method of claim 31, wherein the second plurality of filter media particles further comprises up to about 15 weight percent moisture.

41. The method of claim 37, wherein the second plurality of filter media particles further comprises up to about 15 weight percent moisture.

42. The method of claim 38, wherein the first plurality of filter media particles comprises a Zn salt impregnant.

43. The method of claim 31, wherein the first plurality of filter media particles comprises a Zn impregnant, and wherein the second plurality of filter media particles comprises TEDA and Cu, Ag, Zn, and Mo impregnants.

44. The method of claim 31, wherein the first plurality of filter media particles comprises Cu, Zn, and Mo impregnants, and wherein the second plurality of filter media particles comprises TEDA and is at least substantially free of transition metal impregnants.

* * * * *

UNITED STATES PATENT AND TRADEMARK OFFICE
CERTIFICATE OF CORRECTION

PATENT NO. : 6,344,071 B1
DATED : February 5, 2002
INVENTOR(S) : Smith, Simon J.

It is certified that error appears in the above-identified patent and that said Letters Patent is hereby corrected as shown below:

Title page,
The priority claim is missing. Please insert -- This application claims priority from Provisional Application No. 60/161,331 filed October 25, 1999. --

Column 6,
Lien 52, delete ";" after "streams".

Columns 13-14,
Table IA-1, column 7, delete the second occurrence of "Required".
Table IA-2, column 7, delete the second occurrence of "Required".
Table IA-3, column 7, delete the second occurrence of "Required".

Columns 15-16,
Table IA-3, delete the second occurrence of "Required".
Table IB, delete the second occurrence of "Required".

Column 15,
Line 64, "cyanol,en" should read as -- cyanogen --.

Columns 17-18,
Table II, line 2 of the title, "Comprable" should read as -- Comparable --.
Table III, column G, after "URC)" insert -- 57LPM --.

Columns 19-20,
Table IV, in the headings, last 3 columns, delete "Layer", "155 cc", and "155 cc".
Table IV, column "A", "17.19" should read as -- 17, 19 --.

UNITED STATES PATENT AND TRADEMARK OFFICE
CERTIFICATE OF CORRECTION

PATENT NO. : 6,344,071 B1
DATED : February 5, 2002
INVENTOR(S) : Smith, Simon J.

It is certified that error appears in the above-identified patent and that said Letters Patent is hereby corrected as shown below:

<u>Columns 21-22,</u>
Table VB, column entitled "Pre-Conditioning", line beginning with "Tract Irritant" insert -- 4 --.
Table VB, column entitled "Example J", line beginning with "Sternutator", insert -- 86 -- before "89".

Signed and Sealed this

Twenty-seventh Day of August, 2002

Attest:

Attesting Officer

JAMES E. ROGAN
*Director of the United States Patent and Trademark Office*